US012651781B2

(12) United States Patent
Soon et al.

(10) Patent No.: US 12,651,781 B2
(45) Date of Patent: Jun. 9, 2026

(54) LITHIUM-FREE SECONDARY BATTERY

(71) Applicant: LG ENERGY SOLUTION, LTD., Seoul (KR)

(72) Inventors: Jiyong Soon, Daejeon (KR); Hyunwoong Yun, Daejeon (KR); Jong Keon Yoon, Daejeon (KR)

(73) Assignee: LG ENERGY SOLUTINS LTD., Seoul (KR)

( * ) Notice: Subject to any disclaimer, the term of this patent is extended or adjusted under 35 U.S.C. 154(b) by 586 days.

(21) Appl. No.: 18/018,862

(22) PCT Filed: Nov. 12, 2021

(86) PCT No.: PCT/KR2021/016514
§ 371 (c)(1),
(2) Date: Jan. 30, 2023

(87) PCT Pub. No.: WO2022/108251
PCT Pub. Date: May 27, 2022

(65) Prior Publication Data
US 2024/0047764 A1 Feb. 8, 2024

(30) Foreign Application Priority Data
Nov. 20, 2020 (KR) ........................ 10-2020-0156460
Oct. 18, 2021 (KR) ........................ 10-2021-0138337

(51) Int. Cl.
*H01M 10/42* (2006.01)
*H01M 4/505* (2010.01)
(Continued)

(52) U.S. Cl.
CPC ....... *H01M 10/4235* (2013.01); *H01M 4/505* (2013.01); *H01M 4/525* (2013.01); *H01M 4/661* (2013.01)

(58) Field of Classification Search
CPC .. H01M 10/4235; H01M 4/505; H01M 4/525; H01M 4/661; H01M 4/667;
(Continued)

(56) References Cited

U.S. PATENT DOCUMENTS

2013/0071759 A1* 3/2013 Yamaki ............ H01M 10/0568 429/188
2013/0302699 A1* 11/2013 He ......................... H01M 4/62 29/623.5
(Continued)

FOREIGN PATENT DOCUMENTS

KR 10-1998-073911 A 11/1998
KR 10-2002-0027694 A 4/2002
(Continued)

*Primary Examiner* — Michael Y Sun
(74) *Attorney, Agent, or Firm* — Bryan Cave Leighton Paisner LLP

(57) ABSTRACT

A lithium-free secondary battery is provided. The lithium-free secondary battery includes an anode, an electrolyte, a separator, and a cathode, the anode comprising an anode plate composed of an anode current collector and an insulating layer formed in contact with the anode current collector in a predetermined width along the outermost side of the anode current collector, and is capable of suppressing non-uniform growth of lithium metal layer from the anode at the time of charge and discharge and thereby providing improved safety and capacity retention rate.

7 Claims, 1 Drawing Sheet

(51) Int. Cl.
*H01M 4/525* (2010.01)
*H01M 4/66* (2006.01)

(58) Field of Classification Search
CPC ........ H01M 4/13; H01M 4/66; H01M 10/052; H01M 10/42; H01M 50/463; Y02E 60/10
See application file for complete search history.

(56) References Cited

U.S. PATENT DOCUMENTS

| | | | | |
|---|---|---|---|---|
| 2013/0344357 | A1* | 12/2013 | Miyake ............. | H01M 10/0585 29/623.2 |
| 2017/0133660 | A1 | 5/2017 | Kurihara et al. | |
| 2018/0102522 | A1 | 4/2018 | Yang | |
| 2019/0081346 | A1 | 3/2019 | Yun et al. | |
| 2019/0157648 | A1 | 5/2019 | Yeo et al. | |
| 2020/0403230 | A1 | 12/2020 | Hong et al. | |
| 2021/0075064 | A1 | 3/2021 | Yun et al. | |
| 2021/0194055 | A1* | 6/2021 | Ansari ................ | H01M 50/437 |
| 2022/0271406 | A1* | 8/2022 | Nakai ................... | H01M 4/628 |

FOREIGN PATENT DOCUMENTS

| | | | |
|---|---|---|---|
| KR | 10-2011-0007785 | A | 1/2011 |
| KR | 10-2016-0138120 | A | 12/2016 |
| KR | 10-2018-0035168 | A | 4/2018 |
| KR | 10-2018-0039194 | A | 4/2018 |
| KR | 10-2019-0056666 | A | 5/2019 |
| KR | 10-2019-0057966 | A | 5/2019 |
| KR | 10-2039156 | B1 | 10/2019 |
| KR | 10-2020-0070723 | A | 6/2020 |
| KR | 10-2020-0096106 | A | 8/2020 |

* cited by examiner

【FIG. 1】
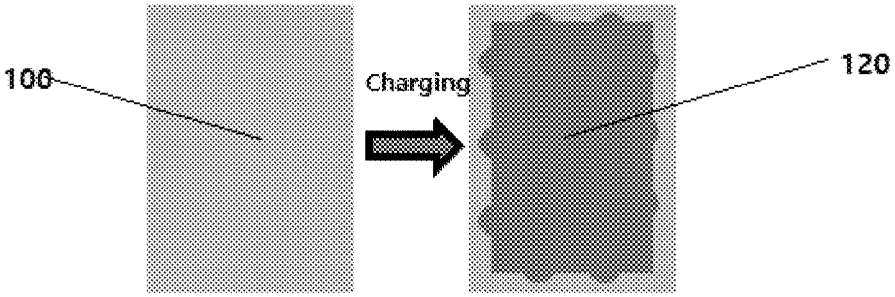
【FIG. 2】
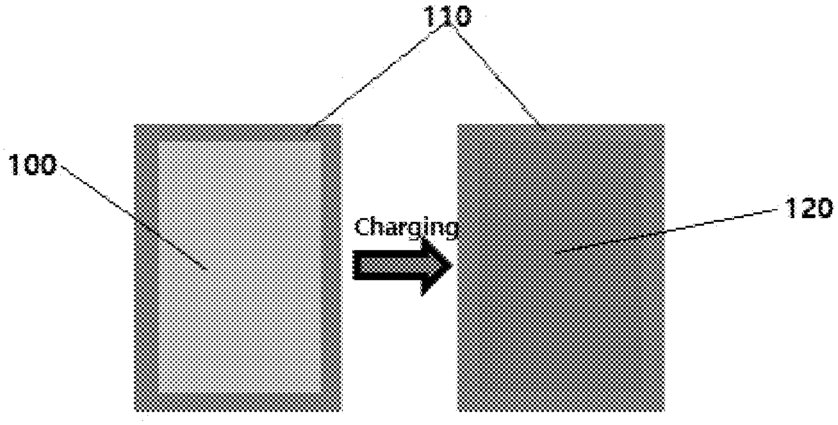

LITHIUM-FREE SECONDARY BATTERY

CROSS REFERENCE WITH RELATED APPLICATION(S)

This application is a National Stage Application of International Application No. PCT/KR2021/016514, filed on Nov. 12, 2021, which claims the benefit of Korean Patent Application No. 10-2020-0156460 filed on Nov. 20, 2020 and Korean Patent Application No. 10-2021-0138337 filed on Oct. 18, 2021, the disclosures of which are incorporated herein by reference in their entirety.

FIELD

The present disclosure relates to a lithium-free secondary battery that suppresses non-uniform growth of a lithium metal layer from an anode at the time of charge and discharge, and exhibits improved performance such as enhanced safety and capacity retention rate.

BACKGROUND

A lithium metal battery to which a lithium metal (Li-metal) anode active material is applied, has an advantage of having substantially higher theoretical energy density and capacity than conventionally used batteries to which graphite-based or lithium alloy-based anode is applied. In this regard, in order to apply such a lithium metal battery as a battery for high energy density, research and development related thereto are being continued.

However, existing lithium metal battery has drawbacks in that volume change of an anode is substantially large during charge/discharge process, and lithium ions moving from cathode to the anode at the time of charge and discharge are stacked on lithium metal layer of the anode, and a needle-like lithium metal layer (lithium dendrite, etc.) grows. As a result, the existing lithium metal battery has drawbacks that possibility of short circuit of electrode is high, and that life characteristics such as safety and capacity retention rate are not sufficient.

Therefore, in recent years, in order to solve the drawbacks of the lithium metal battery and realize a higher energy density, research and interest concerning a lithium-free secondary battery, an anode of which is formed of only an anode current collector (e.g., metal current collector such as copper) without forming a separate lithium metal layer or other anode active material layer on the anode current collector, are growing.

Such a lithium-free secondary battery can exhibit effects such as realizing a higher energy density than a lithium metal battery, and simplifying overall manufacturing process by omitting formation of the lithium metal layer. For example, as shown in FIG. 1, in the lithium-free secondary battery, the anode in a charging/discharging state is composed of only an anode current collector 100 such as copper. In the initial charge/discharge process, the lithium ions of the cathode move to the anode and are stacked on the anode current collector 100.

As a result, the lithium metal layer 120 can be grown on the anode current collector 100, and the lithium metal layer 120 can function as a kind of anode active material layer in a subsequent charge/discharge process.

However, as shown in FIG. 1, in such a conventional lithium-free secondary battery, the lithium metal layer 120 may grow non-uniformly on the anode current collector 100 at the time of initial charge and discharge. Particularly, in the conventional lithium-free secondary battery, the area of the anode is designed to be wider than that of the cathode in order to suppress a short circuit between the electrodes. However, as the lithium metal layer 120 non-uniformly grows to a region close to the outermost side of the anode, a short circuit between the electrodes may still occur.

The occurrence of the short circuit between the electrodes causes ignition, etc., greatly reduces the safety of the lithium-free secondary battery, and also induces a large decrease in life characteristics such as capacity retention rate. Therefore, development of a technology capable of solving these problems is continuously being required.

SUMMARY

The present disclosure provides a lithium-free secondary battery that suppresses non-uniform growth of lithium metal layer from anode at the time of initial charge and discharge, and exhibits improved performance such as enhanced safety and capacity retention rate.

According to the present disclosure, there is provided a lithium-free secondary battery comprising: an anode, an electrolyte, a separator and a cathode, wherein the anode comprises an anode plate composed of an anode current collector; and an insulating layer formed in contact with the anode current collector in a predetermined width along the outermost side of the anode current collector.

According to the present disclosure, a lithium-free secondary battery including an insulating layer formed along the outermost side of an anode current collector is provided. In such a lithium-free secondary battery, lithium ions that move to the anode at the time of initial charge and discharge can be uniformly stacked and grown on the anode current collector in an inner space defined by the insulating layer.

Therefore, the lithium-free secondary battery of the present disclosure can realize a high energy density peculiar to a lithium-free battery, and at the same time, can uniformly grow a lithium metal layer in a charge and discharge process and suppress a short circuit between electrodes. Therefore, the lithium-free secondary battery can exhibit life characteristics such as safety and capacity retention rate that are significantly improved as compared with the related art, and thus can be preferably applied as a next-generation battery.

BRIEF DESCRIPTION OF DRAWINGS

FIG. 1 is a schematic diagram showing that in a lithium-free secondary battery according to a related art, lithium metal layer 120 grows non-uniformly from an anode current collector 100 at the time of charging.

FIG. 2 is a schematic diagram of an anode included in a lithium-free battery according to an embodiment of the present disclosure, showing that lithium metal layer 120 grows uniformly from an anode current collector 100 at the time of charging due to formation of insulating layer 110.

DETAILED DESCRIPTION

Throughout the description, when a part is referred to as "including" a certain component, it means that the component may further include other components, without excluding the other components, unless otherwise stated.

As used herein, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. The term "a step of doing something" or "a step of something" used throughout this specification does not mean a step for something.

Further, as used herein, the term "combinations of" included in Markush type description means mixture or combination of one or more selected from a group consisting of components described in Markush type and thereby means that the disclosure includes one or more selected from the Markush group.

Further, as used herein, the term "lithium-free secondary battery" refers to a secondary battery in which a separate lithium metal layer or another anode active material layer such as carbon layer is not presented on an anode current collector, for example, a metal current collector such as copper, in the state before charging and discharging, for example, in the state immediately after manufacture. Therefore, the "lithium-free secondary battery" can define that the anode plate consists of an anode current collector in the state before charging and discharging, and a separate anode active material layer or a lithium metal layer is not included on the anode current collector. However, it goes without saying that in addition to the anode active material layer or the lithium metal layer, the addition of a separate insulating layer or other thin film that is not involved in the movement of lithium ions and/or electrons at the time of charge and discharge is not limited.

In addition, the term "lithium-free secondary battery" may not be interpreted as limiting the presence of a lithium-containing cathode active material, or limiting the presence of lithium metal or a lithium-containing compound that grows on the anode current collector due to the execution of the charge and discharge.

Based on the above definition and the accompanying drawings, embodiments of the present disclosure will be described in detail. However, these embodiments are presented for illustrative purposes only, and the present disclosure is not limited thereby, and the present disclosure is only defined by the scope of the claims described below. FIG. 2 is a schematic diagram of an anode included in a lithium-free battery according to an embodiment of the present disclosure.

According to one embodiment of the present disclosure, there is provided a lithium-free secondary battery comprising: an anode, an electrolyte, a separator and a cathode, wherein the anode comprises an anode plate composed of an anode current collector; and an insulating layer formed in contact with the anode current collector in a predetermined width along the outermost side of the anode current collector.

As also shown in FIG. 2, in the lithium-free secondary battery of the one embodiment, the insulating layer 110 formed along the outermost side of the anode current collector 100 is provided. The insulating layer 110 can limit the stacking area of lithium ions that moves from the cathode to the anode in the initial charge/discharge process. As a result, lithium ions are selectively stacked only on the anode current collector 100 in the inner space defined by the insulating layer 110, and it can control so that the lithium metal layer 120 is uniformly grown on the anode current collector 100 in the corresponding region.

As a result of the uniform growth of the lithium metal layer 120, it is possible to suppress the non-uniform growth of the lithium metal layer 120 up to the region adjacent to the outermost side of the anode, which mainly causes a short circuit between the electrodes. Further, as the growing region of the lithium metal layer 120 is limited by the insulating layer 110, the problem that the lithium metal layer 120 grows like a needle can also be reduced.

As a result, it was confirmed that it is possible to minimize the phenomenon where a short circuit occurs between the electrodes due to the lithium metal layer 120 or the like that is grown or detached at the edge of the anode current collector 100, and life characteristics such as overall capacity retention rate of lithium-free secondary batteries can also be significantly improved. In addition, it was confirmed that the lithium-free secondary battery of the one embodiment can further reduce the occurrence of a short circuit between electrodes by the lithium metal layer or the like formed on the carbon layer, and further improve the life characteristics such as overall capacity retention rate, even when compared with a battery in which an anode active material layer such as a separate carbon layer is formed on the anode current collector 100.

Therefore, the lithium-free secondary battery of one embodiment can suppress a short circuit between electrodes by uniformly growing the lithium metal layer in the charge/discharge process, while realizing the high energy density peculiar to the lithium-free battery and simplifying the manufacturing process. Therefore, the lithium-free secondary battery can exhibit significantly improved safety and life characteristics such as capacity retention rate, even when compared with the conventional lithium-free battery or lithium metal battery, and therefore, it can be very preferably applied as a next-generation battery.

On the other hand, as already described above, the lithium-free secondary battery of the one embodiment includes an anode current collector, for example, an anode plate composed of a metal current collector containing copper or the like in a state before charging and discharging, and a separate active material layer such as a carbon layer or a lithium metal layer is not provided on the anode current collector.

However, in the process of charging and discharging the lithium-free secondary battery, lithium ions that have moved from the cathode are stacked on the anode current collector, and a lithium metal layer 120 can grow from a surface of the anode current collector 100 of the anode plate, the surface surrounded by the insulating layer 110. This lithium metal layer 120 can function as an anode active material layer in a subsequent charge/discharge step. As a result, the lithium-free secondary battery of one embodiment can realize higher energy density than the existing lithium metal battery.

In such a battery of one embodiment, the insulating layer 110 can be formed by using an insulating polymer so that the space in which the lithium metal layer 120 is grown can be properly defined on the anode current collector 100 without impairing separate electrical characteristics or charge/discharge characteristics.

Examples of such an insulating polymer may include a polyimide resin, for example, a fluorine-containing polyolefin-based resin such as PTFE (polytetrafluoroethylene) resin, or a fluorine-containing polyvinylidene-based resin such as PVDF (polyvinylidene fluoride) resin. However, examples of the insulating polymer are not particularly limited, and it goes without saying that any insulating polymer known to be usable as a binder for electrode in a lithium secondary battery can also be used.

Further, the insulating layer 110 can be formed to be coated or adhered to the surface of the anode current collector along the outermost side of the anode current collector 100. In order to properly form such an insulating layer, the insulating layer is formed by adhering an insulating tape made of the above-mentioned insulating polymer, for example, a polyimide resin material, or can be formed by coating and drying a coating composition containing an insulating polymer such as PVDF resin and an organic solvent such as acetone or NMP. Alternatively, in another example, the insulating layer 110 can be formed by melting an insulating polymer above its melting point and coating and drying it by itself.

On the other hand, in the lithium-free secondary battery, an area of the cathode current collector can be adjusted to be narrower than an area of the anode plate so that occurrence of a short circuit between the electrodes are effectively suppressed due to growth and detachment of the lithium metal layer 120 at the edge portion of the anode.

In order to more effectively suppress a short circuit between the electrodes in a state where the areas between the electrodes are different, the insulating layer 110 is formed to have a constant width along the outermost side of the area of the anode plate, and the area of the cathode current collector can be adjusted to be the same as the area of the anode plate excluding an area where the insulating layer 110 is formed.

In a more specific example, the anode current collector 100 may be formed in a flat shape of a geometric figure such as a square, a pentagon, a circle or an oval, and the length of its longest side or longest diameter may be 1 to 100 cm, or 2 to 70 cm. Further, the insulating layer 110 can be formed in an appropriate width in consideration of the scale of the anode current collector 100. More specifically, it can be formed in a width of 0.3 to 2.0 mm, or 0.3 to 1.5 mm along the outermost side of the anode current collector 100. Further, an area of the cathode current collector may be controlled to be equal to or smaller than an area of the anode plate (or anode current collector) excluding a portion where the insulating layer 110 is formed.

Accordingly, it is possible to more effectively suppress the occurrence of a short circuit between the electrodes due to the non-uniform growth and detachment of the lithium metal layer 120 at the edge of the anode. Further, within the above-mentioned range, the growth region of the lithium metal layer 120 surrounded by the insulating layer 110 is sufficiently secured, so that the battery of one embodiment can exhibit higher energy density and capacity characteristics.

On the other hand, the lithium-free secondary battery of the above-mentioned one embodiment may follow the general configuration and manufacturing method of a lithium-free secondary battery except the formation of the insulating layer 110.

For example, as described above, an insulating layer is formed on the anode current collector to form an anode, and in accordance with a general method, a cathode, an anode, and a separator interposed between the cathode and the anode are stacked to form a battery assembly, and then an electrolyte is injected into the battery assembly to prepare the lithium-free secondary battery of the one embodiment. At this time, except for the negative electrode to which the above-described insulating layer is added, it can follow a conventional configuration and manufacturing method of a lithium-free secondary battery.

Hereinafter, an additional configuration of such a lithium-free secondary battery will be described.

The electrolyte of the lithium-free secondary battery may be a liquid electrolyte (i.e., an electrolyte) or a solid electrolyte. When the electrolyte of the lithium-free secondary battery is a liquid electrolyte, it includes a non-aqueous organic solvent and a lithium salt.

The non-aqueous organic solvent performs the role of a medium through which ions involved in the electrochemical reaction of the battery can move.

The type of the non-aqueous organic solvent is not particularly limited, and an ether-based solvent, a carbonate-based solvent, an ester-based solvent, a ketone-based solvent, an alcohol-based solvent, or an aprotic solvent may be used. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. The ether-based solvent may include dimethyl ether, 1,2-dimethoxyethane, dibutyl ether, tetraglyme, diglyme, 2-methyltetrahydrofuran, tetrahydrofuran, and the like, and the ketone-based solvent may include cyclohexanone, and the like. In addition, the alcohol-based solvent may include ethyl alcohol, isopropyl alcohol, and the like, and the aprotic solvent may include nitriles such as R—CN (where R is a C2 to C20 linear, branched or cyclic hydrocarbon group, which may include a double bonded aromatic ring or an ether bond), amides such as dimethylformamide, dioxolanes such as 1,3-dioxolane, sulfolane, and the like. Among these, from the viewpoint of improving the life characteristics of a lithium-free secondary battery, a carbonate-based solvent or an ether-based solvent can be appropriately used.

Further, the non-aqueous organic solvent may be used alone or in combination of one or more. The mixing ratio when one or more batteries are mixed and used can be appropriately adjusted according to the desired battery performance, which may be widely understood by those worked in the art.

Further, when the carbonate-based solvent is used, it is favorable to use a mixture of cyclic carbonate and chained carbonate. In this case, the cyclic carbonate and the chained carbonate are mixed in a volume ratio of about 1:1 to about 1:9, so that the performance of the electrolyte can be excellently exhibited.

The non-aqueous organic solvent may further include an aromatic hydrocarbon-based organic solvent in addition to the carbonate-based solvent. Here, the carbonate-based solvent and the aromatic hydrocarbon-based organic solvent may be mixed at a volume ratio of about 1:1 to about 30:1.

As the aromatic hydrocarbon-based organic solvent, an aromatic hydrocarbon-based compound of the following Chemical Formula 1 can be used.

[Chemical Formula 1]

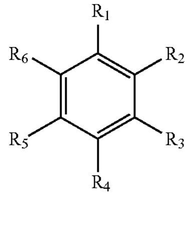

wherein in Chemical Formula 1, $R_1$ to $R_6$ are each independently hydrogen, halogen, a C1 to C10 alkyl group, a C1 to C10 haloalkyl group, or a combination thereof.

The aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodo benzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound of the following Chemical Formula 2 in order to improve the battery lifespan:

[Chemical Formula 2]

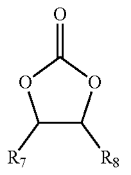

wherein in Chemical Formula 2, $R_7$ and $R_8$ are each independently hydrogen, a halogen group, a cyano group (CN), a nitro group ($NO_2$), or a C1-C5 fluoroalkyl group, and at least one of $R_7$ and $R_8$ is a halogen group, a cyano group (CN), a nitro group ($NO_2$), or a C1-C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound are further used, the lifespan may be improved by appropriately controlling the use amounts thereof.

In the electrolyte solution of the lithium-free secondary battery, the lithium salt is dissolved in an organic solvent to function as a lithium ion supply source, thereby enabling a basic operation of a battery and promoting the movement of lithium ions between a cathode and an anode.

As the lithium salt, in general, a lithium salt widely applied to an electrolyte may be used. For example, the lithium salt may be a fluorine-containing lithium salt. More specifically, lithium bis(fluorosulfonyl)imide (LiFSI) may be used, and additionally, $LiPF_6$, $LiBF_4$, $LiSbF_6$, $LiAsF_6$, $LiC_4F_9SO_3$, $LiN(C_xF_{2x+1}SO_2)(C_yF_{2y+1}SO_2)$ (where x and y are natural numbers), or a combination thereof may be used.

Further, in the electrolyte solution, the concentration of the lithium salt may be controlled within the range of 0.1 to 5.0M. Within this range, the electrolyte solution may have an appropriate conductivity and viscosity, and lithium ions can effectively move in the battery. However, this is merely an example, and the invention is not limited thereto.

The electrolyte solution may be in the form of being impregnated in a porous separator disposed between the anode and the cathode. Here, the porous separator separates the cathode and the anode, and provides a passage for lithium ions to move, and the separator can be used without limitation as long as it is generally used in a lithium battery. That is, a separator having excellent moisture-retention ability for an electrolyte while having low resistance to the movement of electrolyte ions can be used.

Such a separator may be, for example, selected from glass fibers, polyester, Teflon, polyethylene, polypropylene, polytetrafluoroethylene (PTFE), or combinations thereof, and may be a non-woven fabric or a woven fabric. For example, a polyolefin-based polymer separator such as polyethylene, polypropylene, etc. is mainly used, and in order to secure heat resistance or mechanical strength, a coated separator containing a ceramic component or a polymer material can be used, and optionally, a single layer or a multilayer structure can be used.

On the other hand, when the electrolyte of the lithium-free secondary battery is a solid electrolyte, the solid electrolyte that can be used is not particularly limited.

Further, regardless of the electrolyte of the lithium-free secondary battery, the cathode may include a cathode current collector and a cathode mixture layer (cathode active material layer) located on the cathode current collector.

The cathode is manufactured by mixing an active material and a binder, optionally a conductive material, a filler, and the like in a solvent to produce an electrode mixture slurry, and then coating this electrode mixture slurry onto each cathode current collector. Since the above-mentioned electrode manufacturing method is widely known in the art, a detailed description thereof will be omitted herein.

In the case of the cathode active material, there is no particular limitation as long as it is a material capable of reversibly intercalating and de-intercalating lithium ions. For example, it may include one or more of complex oxides of cobalt, manganese, nickel, or a combination of metals; and lithium.

In a more specific example, a compound represented by any of the following chemical formulas can be used as the cathode active material. $Li_aA_{1-b}R_bD_2$ (wherein, $0.90 \le a \le 1.8$ and $0 \le b \le 0.5$); $Li_aE_{1-b}R_bO_{2-c}D_c$ (wherein, $0.90 \le a \le 1.8$, $0 \le b \le 0.5$, and $0 \le c \le 0.05$); $LiE_{2-b}R_bO_{4-c}D_c$ (wherein, $0 \le b \le 0.5$, $0 \le c \le 0.05$); $Li_aNi_{1-b-c}CO_bR_cD_\alpha$ (wherein, $0.90 \le a \le 1.8$, $0 \le b \le 0.5$, $0 \le c \le 0.05$ and $0 < \alpha \le 2$); $Li_aNi_{1-b-c}Co_bR_cO_{2-\alpha}Z_\alpha$ (wherein, $0.90 \le a \le 1.8$, $0 \le b \le 0.5$, $0 \le c \le 0.05$ and $0 < \alpha < 2$); $Li_aNi_{1-b-c}Co_bR_cO_{2-\alpha}Z_2$ (wherein, $0.90 \le a \le 1.8$, $0 \le b \le 0.5$, $0 \le c \le 0.05$ and $0 < \alpha < 2$); $Li_aNi_{1-b-c}Mn_bR_cD_\alpha$ (wherein, $0.90 \le a \le 1.8$, $0 \le b \le 0.5$, $0 \le c \le 0.05$ and $0 < \alpha \le 2$); $Li_aNi_{1-b-c}Mn_bR_cO_{2-\alpha}Z_\alpha$ (wherein, $0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ (wherein, $0.90 \le a \le 1.8$, $0 \le b \le 0.5$, $0 \le c \le 0.05$ and $0 < \alpha < 2$); $Li_aNi_bE_cG_dO_2$ (wherein, $0.90 \le a \le 1.8$, $0 \le b \le 0.9$, $0 \le c \le 0.5$ and $0.001 \le d \le 0.1$); $Li_aNi_bCo_cMn_dG_eO_2$ (wherein, $0.90 \le a \le 1.8$, $0 \le b \le 0.9$, $0 \le c \le 0.5$, $0 \le d \le 0.5$ and $0 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001 \le b \le 0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method may be used as long as it can be coated by a method (e.g., spray coating or dipping method, etc.) that does not adversely affect the physical properties of the cathode active material by using these elements in the compound. Since this is a content that may be widely understood by those worked in the art, a detailed description thereof will be omitted.

The cathode current collector is typically fabricated to a thickness of 3 to 500 μm. The cathode current collector is not particularly limited as long as it has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a cathode active material, and may be formed in various forms such as a film, a sheet, a foil, a net, a porous body, a foaming body, and a non-woven fabric structure.

The conductive material is not particularly limited as long as it has high conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives can be used.

On the other hand, the lithium-free secondary battery of the one embodiment can not only be used in a unit cell used as a power source for a small device, but also it can be used as a unit cell in a medium or large-sized battery module including a plurality of battery cells. Furthermore, a battery pack including the battery module may be configured.

Hereinafter, preferred examples of the present disclosure, comparative examples, and test examples for evaluating them are described. However, the following examples are only preferred examples of the present disclosure, and the present disclosure is not limited to the following examples.

Example 1: Manufacture of Lithium-Free Secondary Battery

Manufacture of Cathode $LiNi_{0.8}Mn_{0.1}Co_{0.1}O_2$ as cathode active material, FX35 (available from Denka) as a conductive material, and, a binder in which DA288 (available from Kureha) and BM-730H (available from Zeon) were mixed in a weight ratio of 9:1, were mixed in a weight ratio of 96:2:2, and these were mixed with NMP as a solvent to prepare a slurry. The cathode active material slurry was coated onto one surface of an aluminum foil (thickness: 20 μm) and then dried. The anode thus prepared was punched into an area of 2.3×5.0 $cm^2$ to manufacture a cathode.

Manufacture of Anode

Copper foil (thickness: 20 um) was punched into an area of 3.4×5.1 $cm^2$, and then polyimide tape (Kaptone tape) was adhered into a width of 0.5 mm onto the edge to manufacture an anode.

Manufacturing of Lithium-Free Secondary Battery

Putting the stack-type electrode assembly made by interposing a polyethylene porous membrane between the cathode and the anode prepared above was put into a pouch-type battery case, and an electrolyte in which 3.4M LiFSI (lithium bis(trifluoromethane)sulfonimide, $Li(N(SO_2CF_3)_2)$ was dissolved in DME (dimethoxyethane) was injected to manufacture a pouch-type lithium-free secondary battery.

Example 2: Manufacture of Lithium-Free Secondary Battery

The lithium-free secondary battery of Example 2 was manufactured in the same manner as in Example 1, except that the following manufacturing method of the cathode was applied.

Manufacture of Anode

A PVdF binder was mixed with an acetone solvent to prepare a solution for forming an insulating layer. Copper foil (thickness: 20 um) was punched into an area of 3.4×5.1 $cm^2$, then the above solution was coated onto the edge in a width of 0.5 mm and dried to manufacture an anode.

Comparative Example 1: Manufacture of Lithium-Free Secondary Battery

The lithium-free secondary battery of Comparative Example 1 was manufactured in the same manner as in Example 1, except that the following manufacturing method of the anode was applied.

Manufacture of Anode

Copper foil (thickness: 20 um) was punched into an area of 3.4×5.1 $cm^2$, and used as an anode.

Comparative Example 2: Manufacture of Lithium-Free Secondary Battery

The lithium-free secondary battery of Comparative Example 2 was manufactured in the same manner as in Example 1, except that the following manufacturing method of the cathode was applied.

Manufacture of Anode

Carbon black and PVdF binder were mixed in a weight ratio of 5:5, and the mixture was mixed with an NMP solvent to prepare a slurry. The slurry was coated in a thickness of 1 μm onto one surface of a copper foil (thickness: 15 μm), and then dried. The anode thus prepared was punched into an area of 3.4×5.1 $cm^2$ and used as the anode.

Experimental Example 1: Evaluation of Capacity Retention Rate of Secondary Battery Using the cells manufactured in Examples and Comparative Examples, first, a charge/discharge test was performed at a current density of 20 mA $g^{-1}$ in the range of 3.0V-4.25V. At this time, the cycle in which the capacity-to-capacity retention ratio at the time of initial charge/discharge was 80% was evaluated, and is shown in Table 1 below.

On the other hand, using the cells manufactured in the Examples and Comparative Examples, the time point of occurrence of cell short circuits was evaluated by the following method. That is, the battery was charged to 4.25 V at a current density of 20 mA $g^{-1}$, a constant voltage of 4.25 V was continuously applied and the time point of occurrence of cell short circuits was confirmed. The time elapsed until the time point of occurrence of cell short circuits is shown in Table below.

For reference, the lithium metal grows like a needle on the anode current collector during the charging process of the lithium-free secondary battery. If charging is continued, such needle-like lithium dendrites can continue to grow and penetrate the separator, which can cause a cell short circuit. Therefore, it is possible to reflect the degree of growth and suppression of the needle-like lithium metal throughout the time point of occurrence of cell short circuits.

TABLE 1

| | Capacity retention rate (80%) | Time point of occurrence of cell short circuits (hr) |
|---|---|---|
| Comparative Example 1 | 21 cycle | 7 hr |
| Comparative Example 2 | 25 cylce | 10.5 hr |
| Example 1 | 33 cycle | 19 hr |
| Example 2 | 28 cycle | 14 hr |

Referring to Table 1, it was confirmed that in Examples, the non-uniform growth of needle-like lithium metal was effectively suppressed, and the time elapsed until the occurrence of cell short circuits was very long compared to Comparative Example 1. In addition, it was confirmed that by suppressing the non-uniform growth of lithium metal, the lithium-free secondary battery of Examples can have superior capacity retention rate and life characteristics compared to Comparative Example 1.

Further, even when comparing the lithium-free secondary battery of Example 2 with a battery in which a carbon layer using carbon black or the like was formed on the anode as in Comparative Example 2, it was confirmed that the batteries of Examples have a longer elapsed time until the occurrence of cell short circuits compared to Comparative Example 2, and the non-uniform growth of lithium metal was further suppressed, and has superior capacity retention rate and life characteristics compared to Comparative Example 2.

The invention claimed is:

1. A lithium-free secondary battery comprising:
an anode;
an electrolyte;
and
a cathode,
wherein the anode comprises an anode plate composed of an anode current collector; and an insulating layer formed in contact with the anode current collector and extending in parallel to the anode current collector up to a predetermined width from an outermost side of the anode current collector,
wherein a lithium metal layer grows as an anode active material from a surface of the anode current collector and does not grow where the insulating layer is formed, as charging and discharging of the lithium-free secondary battery proceed, and
wherein the cathode comprises a cathode current collector and a cathode active material layer formed on the cathode current collector,
wherein the cathode current collector has a same area or smaller than an area of the anode current collector where the lithium metal layer grows excluding an area where the insulating layer is formed.

2. The lithium-free secondary battery according to claim 1, wherein the insulating layer comprises one or more insulating polymer selected from the group consisting of a polyimide resin, a fluorine-containing polyolefin-based resin, and a fluorine-containing polyvinylidene-based resin.

3. The lithium-free secondary battery of claim 1, wherein the anode current collector has a plane in the form of a geometric figure having a length of the longest side or the longest diameter in a range from 1 to 100 cm, and the insulating layer is formed on a surface of the anode current collector so as to have a width of 0.3 to 2.0 mm.

4. The lithium-free secondary battery according to claim 1, wherein the insulating layer is coated or adhered to a surface of the anode current collector.

5. The lithium-free secondary battery according to claim 4, wherein the insulating layer is formed by adhering an insulating tape or is formed by coating and drying a coating composition containing an insulating polymer.

6. The lithium-free secondary battery according to claim 1, wherein the anode current collector comprises copper.

7. The lithium-free secondary battery according to claim 1, wherein the cathode active material layer comprises a cathode active material, and the cathode active material comprises one or more of composite oxides of a metal of cobalt, manganese, nickel, iron, or a combination thereof, and lithium.

* * * * *